(12) United States Patent
Hiraishi et al.

(10) Patent No.: US 6,441,879 B2
(45) Date of Patent: *Aug. 27, 2002

(54) LIQUID CRYSTAL DISPLAY DEVICE

(75) Inventors: Youichi Hiraishi, Tenri; Yasunobu Tagusa, Ikoma; Takayuki Shimada, Yamatokoriyama, all of (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/208,261

(22) Filed: Dec. 9, 1998

Related U.S. Application Data

(62) Division of application No. 08/697,277, filed on Aug. 27, 1996, now Pat. No. 6,204,907.

(30) Foreign Application Priority Data

Sep. 27, 1995 (JP) ............................................. 7-249515

(51) Int. Cl.[7] ..................... G02F 1/1333; G02F 1/1339
(52) U.S. Cl. ..................................... 349/155; 349/138
(58) Field of Search ........................... 349/51, 52, 138, 349/155, 157, 139

(56) References Cited

U.S. PATENT DOCUMENTS

| 4,763,995 A | * | 8/1988 | Katagiri et al. ............. 350/341 |
| 5,032,883 A | | 7/1991 | Wakai et al. ................. 257/72 |
| 5,078,475 A | | 1/1992 | Sekimura et al. ........... 349/155 |

(List continued on next page.)

FOREIGN PATENT DOCUMENTS

| JP | 61 156025 | | 7/1986 |
| JP | 1 35351 | | 7/1989 |
| JP | 1 233423 | | 9/1989 |
| JP | 01289915 A | | 11/1989 |
| JP | 2-37325 | | 2/1990 |
| JP | 2-87118 | * | 3/1990 |
| JP | 02087118 | | 3/1990 |
| JP | 02220032 | | 9/1990 |
| JP | 03220526 A | | 9/1991 |
| JP | 04037721 A | | 2/1992 |
| JP | 04042214 | | 2/1992 |

(List continued on next page.)

OTHER PUBLICATIONS

K. Fujita et al, "Colorless Polyimide", Nitto Giho, vol. 29, No. 1 (Jun. 1991), pp. 20–28.

M. Sakamoto et al, "A High–Aperture–Ratio 3–In.–Diagnonal VGA a–Si Light Valve With Pixel/Data and Pixel/Gate Lines Overlapping", SID 96 Digest, pp. 681–684.

S. S. Kim et al, "High–Aperture and Fault–Tolerant Pixel Structure for TFT–LCDs", SID 95 Digest, pp. 15–18.

*Primary Examiner*—William L. Sikes
*Assistant Examiner*—Dung Nguyen
(74) *Attorney, Agent, or Firm*—Nixon & Vanderhye P.C.

(57) ABSTRACT

A liquid crystal display device is provided with a switching element in neighborhoods of crossing points of a gate wiring and a data wiring. An interlayer insulating film is provided on the switching element. A pixel electrode connected with the switching element is provided on the interlayer insulating film. Moreover, a spacer for keeping a thickness of a liquid crystal layer constant is disposed in the liquid crystal layer and in a sealing member for sealing the liquid crystal layer. Materials of the interlayer insulating film and spacers are optimized. This configuration prevents degradation of a defective ratio and reliability due to the spacer disposed in the liquid crystal layer sinking into the interlayer insulating film.

17 Claims, 4 Drawing Sheets

U.S. PATENT DOCUMENTS

| | | | | |
|---|---|---|---|---|
| 5,084,905 A | | 1/1992 | Sasaki et al. | 349/138 |
| 5,166,085 A | | 11/1992 | Wakai et al. | 437/90 |
| 5,220,446 A | | 6/1993 | Rho | 349/138 |
| 5,381,255 A | | 1/1995 | Ohnuma et al. | 349/157 |
| 5,499,128 A | * | 3/1996 | Hasegawa et al. | 349/155 |
| 5,539,545 A | * | 7/1996 | Shimizu | 349/155 |
| 5,585,951 A | | 12/1996 | Noda et al. | 349/122 |
| 5,641,974 A | | 6/1997 | den Boer et al. | 257/59 |
| 5,771,083 A | | 6/1998 | Fujihara et al. | 349/147 |
| 5,808,712 A | | 9/1998 | Hishida et al. | 349/95 |
| 5,808,830 A | | 9/1998 | Hishida et al. | 360/97.01 |
| 5,831,708 A | | 11/1998 | Hiraishi et al. | 349/143 |
| 5,859,683 A | * | 1/1999 | Tagusa et al. | 349/138 |
| 5,877,830 A | | 3/1999 | Shimada | 349/113 |
| 6,204,907 B1 | * | 3/2001 | Hiraishi et al. | 349/155 |

FOREIGN PATENT DOCUMENTS

| | | |
|---|---|---|
| JP | 04257826 | 9/1992 |
| JP | 4 307521 | 10/1992 |
| JP | 4 74714 | 11/1992 |
| JP | 06-110063 | 4/1994 |
| JP | 06 186580 | 7/1994 |
| JP | 6 230422 | 8/1994 |
| JP | 07-020475 | 1/1995 |

* cited by examiner

LIQUID CRYSTAL DISPLAY DEVICE

This application is a division of U.S. Ser. No. 08/697,277, filed Aug. 27, 1996, now U.S. Pat. No. 6,204,907, issued Mar. 20, 2001.

FIELD OF THE INVENTION

The present invention relates to an active matrix type liquid crystal display device incorporating switching elements, such as Thin Film Transistors (TFTs), and further relates to a manufacturing method of such a device.

BACKGROUND OF THE INVENTION

FIG. 5(a) is a plan view showing a pixel region of an active matrix substrate incorporated in a conventional liquid crystal display device. As shown in FIG. 5(a), the active matrix substrate has a plurality of pixel electrodes 54 provided in a matrix form. Gate wirings 51 and source wirings 52 are provided around the pixel electrodes 54 so as to orthogonally cross each other. A TFT 53 is provided in neighborhoods of crossing points of the gate and source wirings 51 and 52 as a switching element connected to the pixel electrode 54 through a contact hole.

FIG. 5(b) is a cross-sectional view taken along line B—B of the active matrix substrate incorporated in the liquid crystal display device shown in FIG. 5(a). As shown in FIG. 5(b), a gate electrode 61 branching off from the gate wiring 51 shown in FIG. 5(a) is provided on a transparent insulating substrate 60. A gate insulating film 55 is provided to cover the gate electrode 61. A semiconductor layer 64 is provided on the gate insulating film 55 above the gate electrode 61. A channel protection layer 65 is provided on the center of the semiconductor layer 64. Two n$^+$ layers 66, respectively serving as a source area and a drain area, are provided so as to cover both ends of the semiconductor layer 64 and the channel protection layer 65, and to be separated from each other on the channel protection layer 65. The n$^+$ layers 66 are connected respectively to the source electrode 62 branching off from the source wiring 52 and the drain electrode 63. An interlayer insulating film 59 is provided to cover the TFT 53 and the gate and source wirings 51 and 52 provided in this manner. The pixel electrode 54 is provided on the interlayer insulating film 59. The pixel electrode 54 is connected to the drain electrode 63 of the TFT 53 through the contact hole in the interlayer insulating film 59.

Finally, the manufacturing process of the conventional liquid crystal display device becomes complete with sealing liquid crystal 58 between a TFT substrate 70 configured in the above manner and an opposite substrate 71 equipped with an opposite electrode 56. Here, spacers 57 are sandwiched between the TFT substrate 70 and the opposite substrate 71 to maintain a predetermined space therebetween (disclosed in Japanese Laid-Open Patent Application No. 61-156025/1986 Tokukaishou 61-156025).

Polyimide resin is used as the interlayer insulating film 59 in the conventional liquid crystal display device disclosed in the above laid-open patent application. However, other highly transparent materials, such as acrylic resin, polystyrene and polyester, are also generally used.

Although no disclosure is made about the spacers 57, plastic beads and hard materials, such as glass, are usually used. The plastic bead spacer is generally made of polyimide, epoxy and polystyrene.

Nevertheless, if the above-mentioned acrylic resin is used as the interlayer insulating film 59 and the spacers 57 are made using epoxy resin, Newton rings are observed in a lighting test after injecting and sealing the liquid crystal (Newton rings are a series of circular bright and dark bands, which look like a wave pattern created on water surface by a stone dropping into the water). Especially the phenomenon frequently occurs in the sealing portion, and the rings were even more clearly observed with a liquid crystal display device incorporating an interlayer insulating film in an underlayer of the sealing portion. Consequently, such a liquid crystal display device has problems of a high defective ratio and low reliability.

SUMMARY OF THE INVENTION

An object of the present invention is to provide a liquid crystal display device which does not cause Newton rings to occur and which has a low defective ratio and good reliability.

As a step toward achieving the above object, the inventors of the present invention conducted researches to pinpoint causes of Newton rings, and found out that if acrylic resin is used as an interlayer insulating film and epoxy resin is used as spacers as in a conventional liquid crystal display device, the spacers press a pixel electrode, sink into the interlayer insulating film, and thus change the space between a TFT substrate and an opposite substrate, thereby causing Newton rings to occur.

On the contrary, in order to achieve the above object, a liquid crystal display device in accordance with the present invention is configured in a preferred embodiment so that the spacers do not sink into the interlayer insulating film by optimizing materials of the interlayer insulating film and spacers. As a result, various problems with the liquid crystal display device using the resin-made interlayer insulating film are successfully solved.

Specifically, in a first preferred embodiment, the liquid crystal display device includes: a liquid crystal layer; a first substrate provided on one side of the liquid crystal layer; a second substrate provided on the other side of the liquid crystal layer; and a sealing member for sealing the liquid crystal layer between the first and second substrates. The liquid crystal layer has therein at least one first spacer for maintaining a thickness of the liquid crystal layer. The second substrate has: an interlayer insulating film of the same hardness with the first spacer or a greater hardness than the first spacer; a pixel electrode disposed on one side of the interlayer insulating film; at least one switching element disposed on the other side of the interlayer insulating film for controlling a display state of a pixel; and a base substrate facing the first substrate through the liquid crystal layer and the interlayer insulating film.

With the above configuration, the hardness of the interlayer insulating film is either the same as or greater than the hardness of the first spacer. Therefore, the first spacer can be prevented from sinking in the interlayer insulating film surface. Newton rings can be thus prevented from occurring, which improves reliability and defective ratio in manufacture of the liquid crystal display device. Moreover, even if pressure is applied by, for example, a user wiping the liquid crystal display device surface after the liquid crystal display device is manufactured, the space between the substrates are kept constant. The liquid crystal display device with high display quality is obtained for these reasons.

While the interlayer insulating film is formed to have a predetermined hardness in the above liquid crystal display device, an interlayer insulating film of a second preferred embodiment is made of elastic body. The second preferred embodiment is configured in the same manner as the first preferred embodiment, except that a different material is used for the interlayer insulating film. With this configuration, if pressure is applied to the display surface of the liquid crystal display device, the first spacer sinks in the interlayer insulating film surface and the space between the substrates changes temporarily. Nevertheless, as the pressure is removed, resilient power occurs and the space recovers to the predetermined space. Therefore, the space between the substrates of the liquid crystal display device are kept constant. The liquid crystal display device with good reliability, a low defective ratio and high display quality can be provided for these reasons in the same manner as in the first preferred embodiment.

In either of the liquid crystal display devices of the first and second preferred embodiments, the interlayer insulating film is preferably made of resin having a transmittance in the visible ray area of not less than 90%. With this configuration, especially if the interlayer insulating film is incorporated in a transparent type liquid crystal display device, it is possible to obtain beautiful image display with no coloring. Moreover, since transmittance can be prevented from deteriorating, it is possible to restrain increase of power consumption of the backlight.

Incidentally, in the two embodiments above, the material for the interlayer insulating film is restricted in terms of hardness or elasticity, compared with prior art. As a result, there occurs a case where only an inferior material to conventional materials in terms of adherence and the like c an b e s elected to satisfy this point.

The following description discusses a preferred method of manufacturing a liquid crystal display device when, for example, the material for the interlayer insulating film does not have desirable adherence as mentioned above. A method of manufacturing a liquid crystal display device including: a pixel electrode and a switching element for determining a display state of a pixel; an interlayer insulating film disposed between the switching element and the pixel electrode; and a base substrate provided with the interlayer insulating film, the switching element and the pixel electrode preferably includes steps of: (1) providing the switching element on the base substrate; (2) providing the interlayer insulating film on the switching element; (3) improving film property by making an interlayer insulating film surface rough; and (4) providing the pixel electrode on the interlayer insulating film.

The third step includes, for example, a step of ashing treatment or light radiation in which the interlayer insulating film surface is made rough prior to the fourth step of providing the pixel electrode. As a result, even if a material of poor surface adherence is used as the resin forming the interlayer insulating film, the interlayer insulating film and the pixel electrode can adhere to each other with no trouble. Note that if the film property improving treatment is ashing treatment or light radiation treatment, the treatment can be carried out as follows. If the interlayer insulating film is photosensitive, the treatment can be carried out at the same time with a process of removing residue of the photosensitive resin, whereas if the interlayer insulating film is not photosensitive, the treatment can be carried out at the same time with a process of removing photoresist during patterning of the interlayer insulating film. This can avoid an increase of the number of manufacturing processes, compared with prior art.

Moreover, a method of manufacturing the above liquid crystal display device preferably includes steps of: providing the switching element on the base substrate; providing the interlayer insulating film on the switching element; drying the interlayer insulating film with prebaking treatment before patterning the interlayer insulating film; patterning the interlayer insulating film; and providing the pixel electrode on the interlayer insulating film.

With the configuration, the interlayer insulating film is dried with prebaking treatment before pattering the interlayer insulating film. Therefore, it is possible to prevent bad affection, such as dimensional distortion when the resin really cures, and to reduce viscosity of the resin forming the interlayer insulating film. Consequently, it is possible to improve productivity and dimensional accuracy in manufacture of the liquid crystal display device.

Moreover, the inventors of the present invention studied occurrence frequency of Newton rings with the above conventional liquid crystal display device, and confirmed among other things that Newton rings frequently occur in the sealing portion and that the rings were more clearly observed with a liquid crystal display device incorporating an interlayer insulating. film in an underlayer of the sealing portion.

On the other hand, in a preferred embodiment, the liquid crystal display device in accordance with the present invention includes: a liquid crystal layer; a first substrate provided on one side of the liquid crystal layer; and a second substrate having a base substrate facing the first substrate through the liquid crystal layer. On the base substrate of the second substrate, a sealing area is provided outside the display area, such as in the periphery of the base substrate. Moreover, an interlayer insulating film is provided between the base substrate and the liquid crystal layer, except in the sealing area. At least one switching element for controlling a display state of a pixel is provided on one side of the interlayer insulating film, whereas the pixel electrode is provided on the other side of the interlayer insulating film. In addition, the liquid crystal display device includes a sealing member, disposed to be in contact with the second substrate in the sealing area, for sealing the liquid crystal layer between the first and second substrates.

In the above configuration, the interlayer insulating film is not provided in the area where the sealing member and the second substrate are in contact with each other. Therefore, the space between the substrates can be prevented from varying when the sealing member cures. As a result, it is possible to prevent Newton rings to occur in a neighborhood of the sealing member. Besides, the defective ratio and reliability can be improved in manufacture of the liquid crystal display device.

As an addition to the above configuration, a second spacer is provided in the sealing member to maintain a thickness of the sealing member. Preferably, the second spacer satisfies at least one of the two conditions: the second spacer (1) is larger in size than the first spacer and (2) has a greater hardness than the first spacer. With this configuration, the space between the first and second substrates can be maintained with certainty. Therefore, the liquid crystal display device with high display quality can be realized.

In addition, in order to keep the space between the substrates constant, the liquid crystal display device preferably includes a middle film, provided on the sealing area of the base substrate, having better adherence than the base substrate. With this configuration, the adherence of the sealing member portion is improved, and the highly reliable liquid crystal display device can be obtained. Moreover, the middle film is preferably at least one film selected from the group consisting of a metallic film, a nitride film and an oxide film. In this case, the material for the middle film becomes the same with the material for the source wiring of the switching element and the like. Therefore, one process can be shared for forming the switching element and for forming the middle film, which is especially preferable.

For a fuller understanding of the nature and advantages of the invention, reference should be made to the ensuing detailed description taken in conjunction with the accompanying drawings.

DESCRIPTION OF THE EMBODIMENTS
[FIRST EMBODIMENT]

Figure 1A:
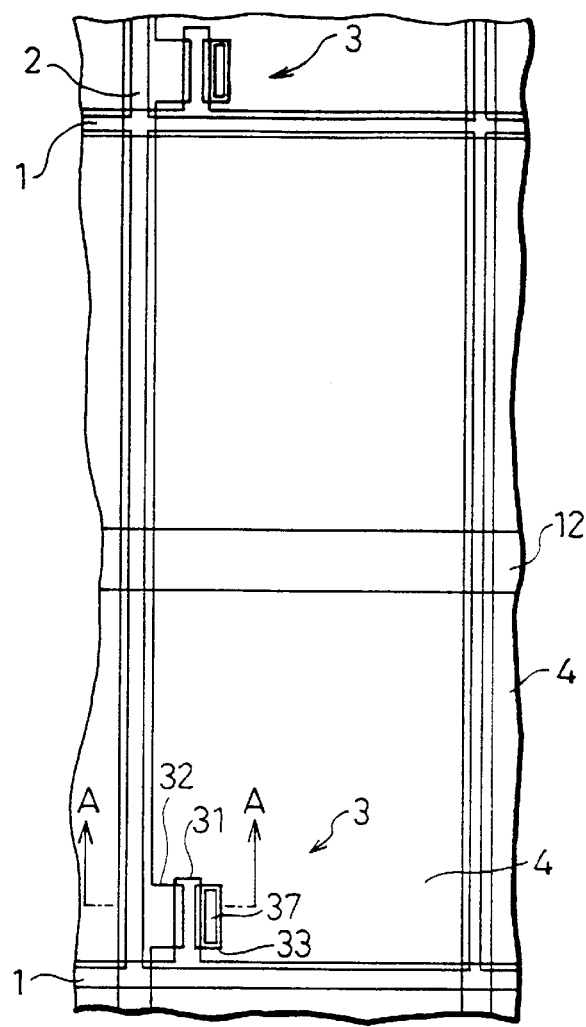
FIG. 1(a) is a plan view showing an arrangement of a pixel region of an active matrix substrate incorporated in a liquid crystal display device of a first embodiment in accordance with the present invention.

FIG. 1(a) is a plan view showing an arrangement of a pixel region of an active matrix substrate incorporated in a liquid crystal display device of a first embodiment in accordance with the present invention.

As shown in FIG. 1(a), the active matrix substrate has a plurality of pixel electrodes 4 provided in a matrix form. Gate wirings 1 as scanning wirings and source wirings 2 as signal wirings are provided in an underlayer of the pixel electrodes 4 so as to surround each of the pixel electrodes 4 and orthogonally cross each other. Parts of the gate and source wirings 1 and 2 are provided so as to overlap with a periphery of the pixel electrodes 4. A TFT 3 as a switching element is provided in a neighborhood of a crossing point of the gate and source wirings 1 and 2. The TFT 3 may be a switching element such as an MIM (Metal-Insulator-Metal).

In the TFT 3, a gate electrode 31 and a source electrode 32 are provided so as to branch off from the gate wiring 1 and the source wiring 2 respectively. A drain electrode 33 is connected to the pixel electrode 4 in an upper layer of the drain electrode 33 through a contact hole 37.

Moreover, on the active matrix substrate, a wiring for providing storage capacity (Cs wiring) 12 is provided in the middle of the pixel electrode 4 in the same layer with the gate wirings 1 in the same process as the gate wirings 1. Since Cs on Com method is adopted as the wiring method of the Cs wirings 12 in the present embodiment, the Cs wirings 12 are all connected to a common wiring.

Figure 1B:
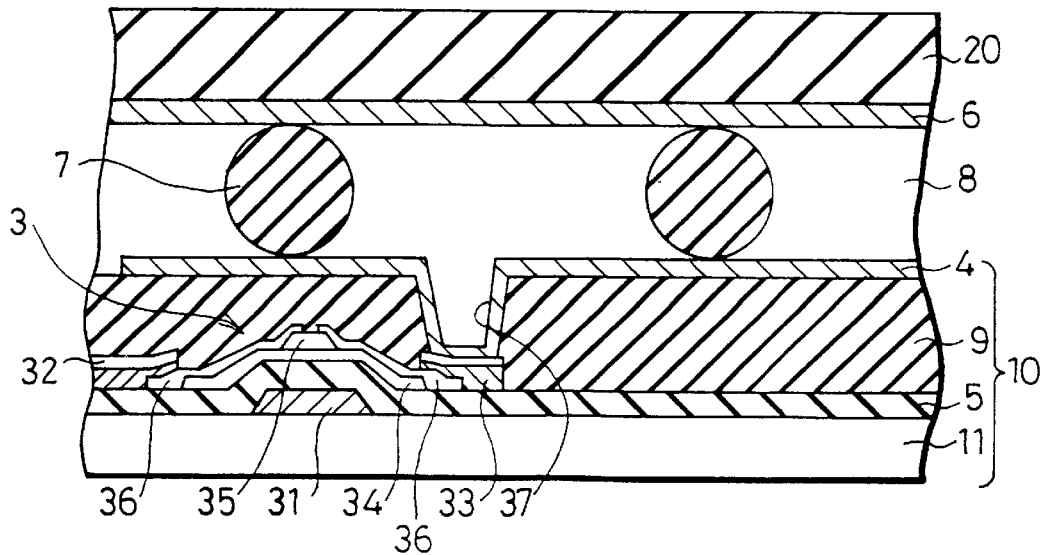
FIG. 1(b) is a cross-sectional view taken along line A—A of the active matrix substrate incorporated in the liquid crystal display device shown in FIG. 1(a).

FIG. 1(b) is a cross-sectional view taken along line A—A of the active matrix substrate incorporated in the liquid crystal display device shown in FIG. 1(a).

As shown in FIG. 1(b), a TFT substrate 10 having the TFT 3 and pixel electrode 4, and an opposite substrate 20 having an opposite electrode 6 are provided so as to face each other through liquid crystal 8.

The following description will explain a structure of the TFT substrate 10, beginning with the lowest layer and then upwards. The gate electrode 31 branching off from the gate wiring 1 shown in FIG. 1(a) is provided on a transparent insulating substrate 11. A gate insulating film 5 is provided to cover the gate electrode 31. A semiconductor layer 34 is provided on the gate insulating film 5 above the gate electrode 31. A channel protection layer 35 is provided on the center of the semiconductor layer 34. Two $n^+$ layers 36, respectively serving as a source area and a drain area, are provided so as to cover both ends of the channel protection layer 35 and a part of the semiconductor layer 34 provided on both sides of the channel protection layer 35, and to be separated from each other on the channel protection layer 35. The $n^+$ layers 36 are connected respectively to the source electrode 32 and the drain electrode 33.

An interlayer insulating film 9 is provided to cover the TFT 3 provided in this manner. The pixel electrode 4 is provided on the interlayer insulating film 9. The pixel electrode 4 is connected to the drain electrode 33 of the TFT 3 through the contact hole 37 in the interlayer insulating film 9. An orientation film (not shown) is provided on the pixel electrode 4.

Meanwhile, another orientation film is provided on the opposite electrode 6 on the opposite substrate 20. The liquid crystal layer 8 is sealed between the TFT substrate 10 and opposite substrate 20, or more precisely, between the orientation films provided respectively on the TFT and opposite substrates 10 and 20.

Spacers 7 are provided between the TFT substrate 10 and the opposite substrate 20 to maintain the space therebetween. Here, an acrylic resin having a Rockwell hardness of M90 is used as the interlayer insulating film 9, and a polystyrene having a Rockwell hardness of M80 is used as the spacers 7.

Since such a highly transparent acrylic resin is used as the material of the interlayer insulating film 9 in the present embodiment, a liquid crystal display device of excellent display quality with no coloring is obtained. Moreover, the polystyrene used as the material of the spacers 7 is softer than the interlayer insulating film 9. Therefore, the spacers 7 do not sink into the TFT substrate 10, thereby keeping the space between the substrates 10 and 20 constant. Consequently, the liquid crystal display device causing no Newton ring to occur and having high display quality is obtained.

The active matrix substrate of the first embodiment in accordance with the present invention is configured in the above manner. The following description will explain a manufacturing method of the active matrix substrate.

First, the gate wirings 1 (the gate electrode 31), gate insulating film 5, semiconductor layer 34, channel protection layer 35 and $n^+$ layer 36 are formed sequentially with film disposition patterning. The gate wirings 1 (the gate electrode 31) are made of metals, such as Al, Ta and Cr: the gate insulating film 5 is made of, for example, SiNx and $SiO_2$: the semiconductor layer 34 is made of, for example, Si: the channel protection layer 35 is made of, for example, SiNx. The manufacturing process so far is the same as a conventional method of manufacturing active matrix substrates.

Next, the source wirings 2 (the source electrode 32 and the drain electrode 33) are formed. In the present embodiment, a two-layered wiring is provided by forming ITO (Indium Tin Oxide) on a wiring made of metals such as Al, Ta and Cr when the above-mentioned members 2, 32 and 33 are formed. This enables the wiring to have disconnection redundancy, and mounting terminal portions to have low resistance.

Next, on the source wirings 2, a photosensitive acrylic resin film is formed as the interlayer insulating film 9 with spin coat method to have a thickness of, for example, 3 $\mu$m. The film thickness depends on permittivity of the film made of, for example, the resin. This is because a parasitic capacity is caused by the stacking of the wirings and the pixel electrode 4. Therefore, the permittivity of the resin used is preferably as low as possible. The resin is then exposed in a necessary pattern and treated with an alkaline solution. Thus, only the exposed part is etched with the alkaline solution, and the contact hole 37 is formed through the interlayer insulating film 9.

Here, if the resin can be made photosensitive, the resin is preferably made photosensitive. This is because if a photosensitive acrylic resin is used, it is possible to perform patterning with photo processing alone. More preferably, a low viscosity resin is used and the resin is dried with prebaking treatment before patterning. More specifically, a film having a thickness of 3 $\mu$m is formed as the interlayer insulating film 9 with spin coat method from a solution including the photosensitive acrylic resin. For example, an acrylic resin having a viscosity of 29.0 cp is applied at a spin rotation of 900 to 1000 rpm. This makes the interlayer insulating film 9 even, thereby eliminating roughness conventionally occurring on the pixel electrodes 4. As a result, undesirable orientation of the liquid crystal is restrained, which improves display quality of the liquid crystal display device. Next, the substrate coated with the above solution is heated up to about 100° C. and then solvent for the photosensitive transparent acrylic resin (e.g., ethyl lactate and propylene glycol monomethylether acetate) is dried. The prebaking treatment in this manner improves productivity and prevents bad affection, such as dimensional distortion when the resin really cures.

Resin with poor surface adherence may be improved by making the surface rough with ashing treatment or light radiation at this stage. If a photosensitive resin is used as the interlayer insulating film 9, those treatments can be carried out at the same time with a process of removing residue of the photosensitive resin. In contrast, if a non-photosensitive material is used as the interlayer insulating film 9, the treatments can be carried out at the same time with the photoresist removing process. Therefore, in either case, the treatments can be carried out without changing the conventional number of manufacturing processes of the liquid crystal display device.

The above ashing treatment is carried out in the following manner before the pixel electrodes 4 are formed. oxygen plasma treatment is carried out to the surface of the interlayer insulating film 9 with, for example, a dry etching device to the depth (film thickness) of 1000 to 3000 Å from the surface of the interlayer insulating film 9.

More specifically, for example, the acrylic resin surface receives ashing treatment with a parallel plate plasma etching device at an RF power of 1.2 kW, a pressure of 800 mTorr, an oxygen flow of 300 sccm, a temperature of 70° C. and an RF application time of 120 sec. Here, the acrylic resin surface is rid of water and carbon dioxide due to oxidation and discomposition of organic substance in the oxygen plasma. As a result, the acrylic resin surface becomes rough. Apart from the above mentioned dry etching device, dry etching devices of other types, such as of a barrel type and of an RIE (Reactive Ion Etching) type, can also achieve the same effects in adherence improvement.

Ashing treatment is effective when the interlayer insulating film 9 is treated to the depth of more than 1000 Å from the surface thereof. However, if ashing treatment is carried out too deeply into the interlayer insulating film 9, the film thickness is decreased by a large amount, and thus the thickness of the interlayer insulating film 9 becomes uneven. As a result, the orientation also becomes disordered, which affects display by the liquid crystal display device. Therefore, ashing treatment is controlled so as to reach the depth of not more than 5000 Å, and preferably the depth of not more than 3000 Å.

Meanwhile, specifically, light radiation treatment is carried out by, for example, radiating an ultraviolet ray, such as an excimer ray, to the surface of the interlayer insulating film 9 in ozone atmosphere. The radiation makes the surface of the interlayer insulating film 9 rough, and thereby achieving the same effect as the above mentioned ashing treatment. Note that conditions for light radiation treatment, such as the film depth receiving the light radiation, are set in the same manner as ashing treatment.

After the interlayer insulating film 9 is formed with patterning and the contact hole 37 is formed, the ITO as the pixel electrode 4 is formed with sputtering method and treated with patterning. The pixel electrode 4 is thus connected to the drain electrode 33 of the TFT 3 through the contact hole 37 in the interlayer insulating film 9.

The TFT substrate 10 manufactured in this manner and the opposite substrate 20 on which the opposite electrodes 6 are formed are put together, with a sealing member (not shown) maintaining the space of the peripheral portion and the spacers 7 maintaining the space of the other portions. Then, the liquid crystal layer 8 is enclosed between the two substrates. The liquid crystal display device of the first embodiment in accordance with the present invention is manufactured in this manner.

Here, the acrylic resin having a Rockwell hardness of M90 is used as the material of the interlayer insulating film 9, and the polystyrene having a Rockwell hardness of M80 is used as the material of the spacers 7. However, other materials may be used for the interlayer insulating film 9 and the spacer 7 as described in the following.

If the active matrix substrate is incorporated in a transparent type liquid crystal display device, the interlayer insulating film 9 is preferably highly transparent, and more specifically an interlayer insulating film 9 with a transmittance in the visible ray area of more than 90% is preferred. Here, visibility of a blue color (400 to 500 nm) is slightly inferior to visibility of green and red colors. Therefore, if a material with slight coloring is to be used, considering that spectral transmittance varies depending on colors, a material having a spectral transmittance as close to 100% as possible for the green and red colors and having a slightly inferior spectral transmittance for the blue color may be used. Therefore, preferred material examples of the interlayer insulating film 9 of the above-mentioned active matrix substrate include polyamide imide (E61 to 74), polyalylate (M87 to 93), polyetherimide (M105 to 109), epoxy (M80 to 110), highly transparent polyimide (E45 to 58; for example, a composition of diamine and acid dianhydride including hexafluoropropylene).

Meanwhile, if the active matrix substrate is incorporated in such a transparent type liquid crystal display device, the spacers 7 are not necessary transparent: for example, black-colored spacers may be also used. Therefore, the spacers 7 have more material choices than the interlayer insulating film 9, and may be made of the same material as the interlayer insulating film 9 or a softer material than the interlayer insulating film 9.

Moreover, if the active matrix substrate is incorporated in a reflection type liquid crystal display device, the interlayer insulating film 9 has much more material choices than in the previous case where the active matrix substrate is incorporated in the transparent type liquid crystal display device. For example, a coloring agent, such as well-known Kapton (trademark of E. I. du Pont de Nemours and Co.) may be used in polyimide.

[SECOND EMBODIMENT]

A liquid crystal display device of a second embodiment in accordance with the present invention is basically configured in the same manner as that of the first embodiment. The only change is that in an active matrix substrate incorporated in the liquid crystal display device of the second embodiment, an interlayer insulating film 9 is formed using a resin of a high elastic modulus, especially of high impact resilience.

Here, the liquid crystal display device employing the interlayer insulating film 9 made of the high impact resilience resin has the following advantage: if pressure is applied on a panel surface (for example, while the upper and lower substrates are being put together, or when the panel is pushed by a finger after the panel is manufactured), the surface of the interlayer insulating film 9 temporarily caves in. However, as the pressure is removed, the surface of the interlayer insulating film 9 returns to the original state with the elasticity (resilience), and the space between the substrates, which has been distorted by the pressure, also returns to the original state.

Preferred examples of the resin of a high elastic modulus employed in the second embodiment in accordance with the present invention include butadienestyrene copolymer, butyl rubber and fluororubber for the transparent type liquid crystal display device; and rubber-like elastic macromolecule, such as polyolefin elastomer and polyurethane rubber, for the reflection type liquid crystal display device.

[THIRD EMBODIMENT]

Figure 2:
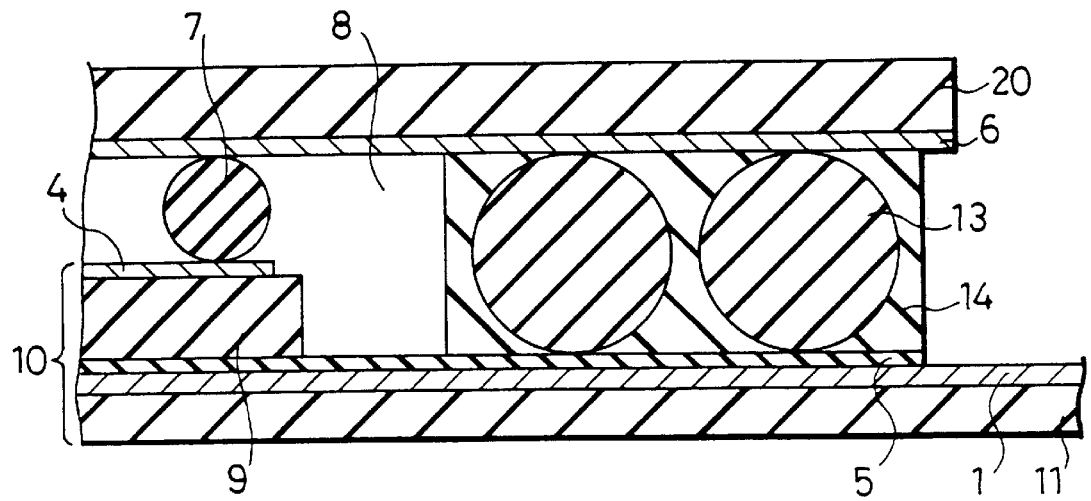
FIG. 2 is an enlarged cross-sectional view showing a neighborhood of a sealing portion in a liquid crystal display device of a third embodiment in accordance with the present invention.

FIG. 2 is an enlarged cross-sectional view showing a neighborhood of a sealing portion in a liquid crystal display device of a third embodiment in accordance with the present invention. Here, for convenience, members having the same function as members illustrated in FIGS. 1(a) and 1(b) are indicated by the same reference numerals and description thereof is omitted.

First, TFT substrate 10 is manufactured in the same manner as in the first embodiment. Then as shown in FIG. 2, a part of an interlayer insulating film 9 under a seal 14 is removed during patterning of the interlayer insulating film 9. Therefore, gate wirings 1 and a gate insulating film 5 formed on the gate wirings 1 are provided on a transparent insulating substrate 11 below the seal 14. The interlayer insulating film 9 and a pixel electrode 4 are stacked on the gate wirings 1 and gate insulating film 5 on the transparent insulating substrate 11 inside the seal 14.

Then, a TFT substrate 10 and an opposite substrate 20 on which opposite electrodes 6 are formed are put together, sandwiching the seal 14 with a predetermined space therebetween. The predetermined space is maintained by spacers 7 and 13. The spacer 13 disposed in the seal 14 is larger in diameter than the spacer 7 disposed in a display area (in a liquid crystal layer 8).

With this configuration, the problem of inappropriate display in a neighborhood of the seal 14, that is, frequent occurrence of Newton rings, is solved. If hard substance, such as glass beads, is used as the spacers 13 in the seal 14, the problem is solved more effectively. The spacers 7 in the display area are preferably, for example, plastic beads, such as polyimide, epoxy and polystyrene beads. The spacers 7 in the display area may flow into the seal 14 during the manufacture of the liquid crystal display device. Nonetheless, this does not cause a serious problem.

Figure 3:
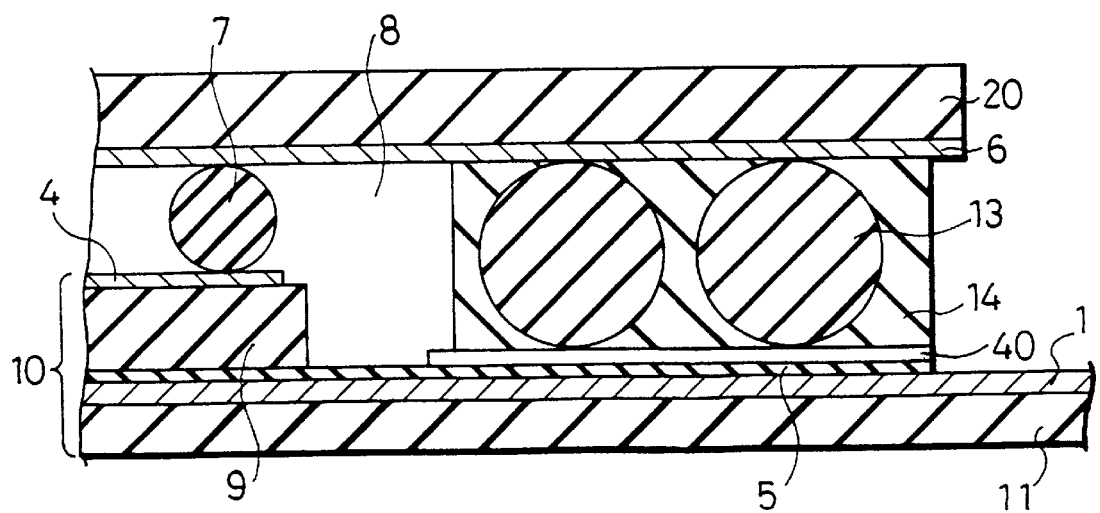
FIG. 3 is an enlarged cross-sectional view showing a neighborhood of a sealing portion in a variant example of the above liquid crystal display device.

The adherence of the seal 14 is improved by adding a middle layer 40 to the liquid crystal display device manufactured in the above-mentioned manner. As shown in FIG. 3, the middle layer 40 is provided above the transparent insulating substrate 11 under the seal 14 so as to include source wirings 2 and ITO therein. The middle layer 40 is also effective in handling static electricity. Examples of preferred material for the source wirings 2 and pixel electrodes 4 include metals, nitrides and oxides.

Figure 4:
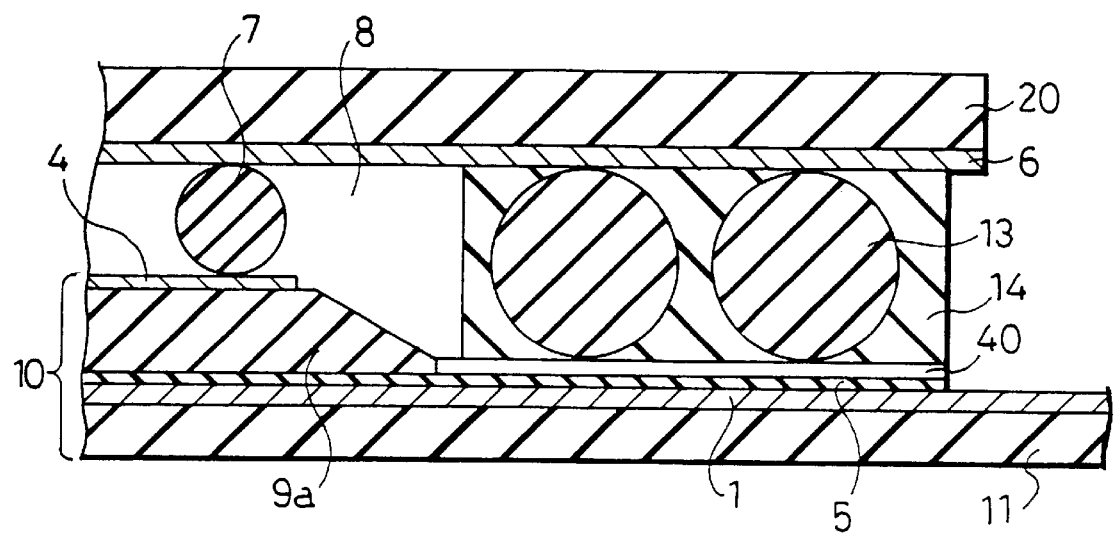
FIG. 4 is an enlarged cross-sectional view showing a neighborhood of a sealing portion in another variant example of the above liquid crystal display device.

Moreover, foam and the like can be prevented from occurring during injection of the liquid crystal layer 8 by a sloping edge of an interlayer insulating film 9a formed as shown in FIG. 4. The liquid crystal 8 can be thus smoothly injected.

The active matrix substrate of the third embodiment in accordance with the present invention is configured in the above manner. The following description will explain a manufacturing method of the active matrix substrate. Explanation of the same processes as in the manufacturing method for the first embodiment is omitted.

The same method as the first embodiment is employed from the first process through the process of providing the interlayer insulating film 9 on the transparent insulating substrate 11. Next, a contact hole is formed with patterning of the interlayer insulating film 9. A periphery of the display area, i.e., a part of the interlayer insulating film 9 under a portion where the seal 14 is provided is removed during the patterning of the interlayer insulating film 9 in the same manner as the contact hole portion is removed. Then, the pixel electrodes 4 are provided on a portion corresponding to the display area of the interlayer insulating film 9. An orientation film (not shown) is then disposed.

The peripheral portions of the TFT substrate 10 manufactured in this manner and of the opposite substrate 20 on which the opposite electrodes 6 are formed are sealed with the seal 14 made from a thermosetting resin, such as an epoxy resin, a photosetting resin and the like. The space between the two substrates is kept constant with the spacers 7 and 13.

Finally, the last manufacturing processes of the liquid crystal display device of the third embodiment in accordance with the present invention are to cure the seal 14 and to inject the liquid crystal layer 8.

In the third embodiment in accordance with the present invention, since the interlayer insulating film 9 is not provided under the portion where the seal 14 is provided, the space between the two substrates does not change due to curing shrinkage or thermal expansion of the resin forming the interlayer insulating film 9 when the seal 14 cures.

Moreover, in the third embodiment in accordance with the present invention, the gate insulating film 5 is provided under the portion where the seal 14 is provided to improve adherence with the seal 14. At this time, the seal 14 including the spacers 13 in advance is preferred for use to improve productivity.

The present invention is explained with the liquid crystal display device adopting Cs on Com method as the wiring method of the wiring for providing storage capacity (Cs wiring). However, this may be a liquid crystal display device adopting Cs on Gate method.

As discussed above, the main object of the liquid crystal display device of the first through third embodiments is to eliminate the problem of the conventional liquid crystal display device, that is, occurrence of Newton rings observed in a lighting test after injecting the liquid crystal.

Figure 5A:
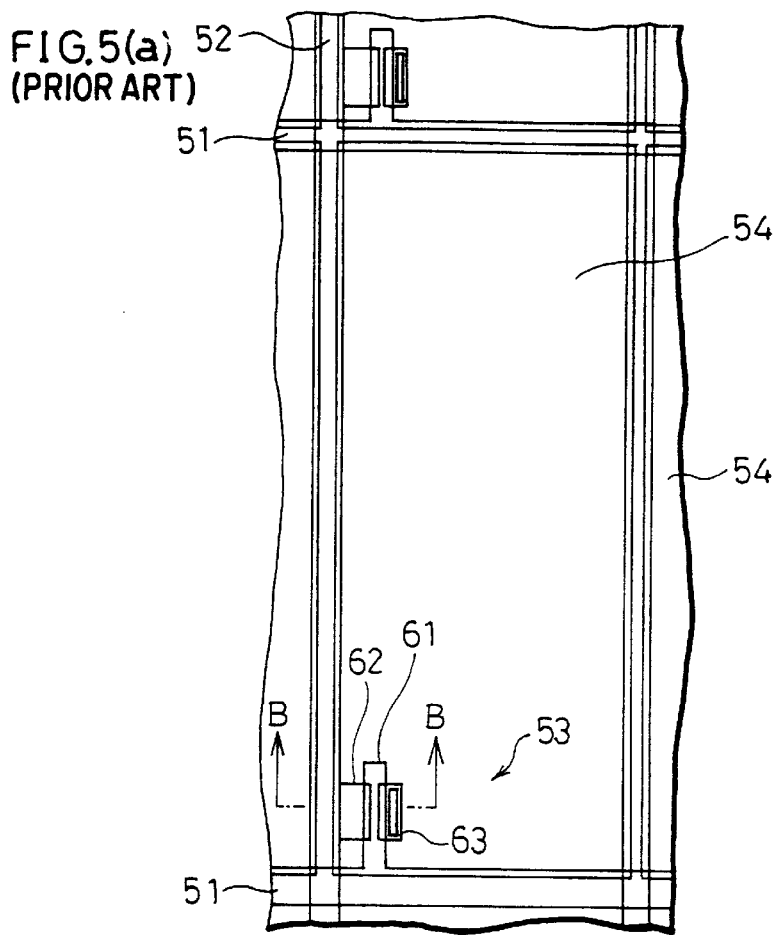
FIG. 5(a) is a plan view showing a pixel region of an active matrix substrate incorporated in a conventional liquid crystal display device.
Figure 5B:
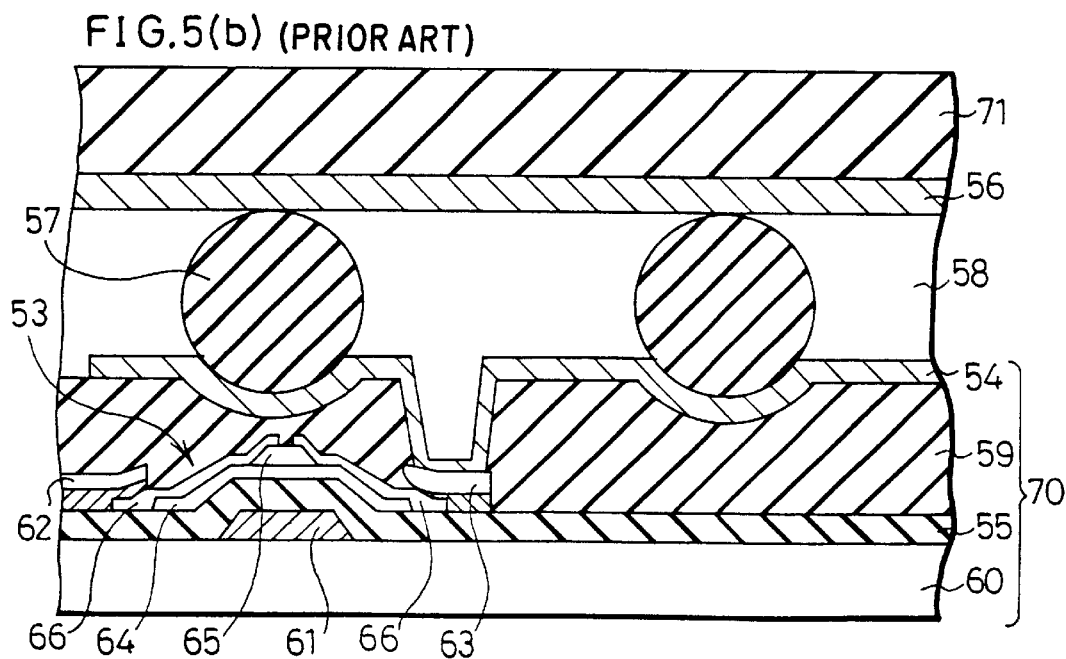
FIG. 5(b) is a cross-sectional view taken along line B-B of the active matrix substrate incorporated in the liquid crystal display device shown in FIG. 5(a).

As a step toward achieving the above object, the inventors of the present invention conducted researches to pinpoint causes of Newton rings, and found out that if acrylic resin is used as the interlayer insulating film 59 and epoxy resin is used as the spacers 57 as in the conventional liquid crystal display device shown in FIG. 5(b), the spacers 57 press the pixel electrode 54, sink into the interlayer insulating film 59, and thus change the space between the TFT substrate 70 and the opposite substrate 71, thereby causing Newton rings to occur.

Despite the fact that the pixel electrodes 54 made of ITO, Al and the like are formed on the interlayer insulating film 59, the spacers 57 still sink. This is likely to be caused by the absolutely thin pixel electrode 54: the pixel electrode 54 has a thickness of 500 Å to 2000 Å. and the interlayer insulating film 59 has a thickness of 1.5 $\mu$m to 4 $\mu$m. The same reasoning is likely to apply to the orientation film (not shown).

In this manner, in the conventional liquid crystal display device, the spacer 57 sinking into the interlayer insulating film 59 causes Newton rings to occur during the lighting test, thereby resulting in a deteriorating defective ratio and reliability.

On the contrary the liquid crystal display devices of the first and second embodiments are configured so that the spacers do not sink into the interlayer insulating film by optimizing the materials of the interlayer insulating film and spacers. As a result, various problems with the liquid crystal display device using the resin-made interlayer insulating film are successfully solved.

Specifically, in the first embodiment, the hardness of the spacers and the interlayer insulating film are adjusted. The liquid crystal display device of the first embodiment includes: a liquid crystal layer; a first substrate (the opposite substrate 20) provided on one side of the liquid crystal layer; a second substrate (the TFT substrate 10) provided on the other side of the liquid crystal layer; and a sealing member (the seal 14) for sealing the liquid crystal layer between the first and second substrates. The liquid crystal layer has therein at least one first spacer (the spacer 7) for maintaining a thickness of the liquid crystal layer. The second substrate has: an interlayer insulating film of the same hardness with the first spacer or a greater hardness than the first spacer; a pixel electrode disposed on one side of the interlayer insulating film; at least one switching element (the TFT 3) disposed on the other side of the interlayer insulating film for controlling a display state of a pixel; and a base substrate (the transparent insulating substrate 11) facing the first substrate through the liquid crystal layer and the interlayer insulating film.

With the above configuration, the hardness of the interlayer insulating film is either the same as or greater than the hardness of the first spacer. Therefore, the first spacer can be prevented from sinking in the interlayer insulating film surface. Newton rings can be thus prevented from occurring, which improves reliability and defective ratio in manufacture of the liquid crystal display device. Moreover, even if pressure is applied by, for example, a user wiping the liquid crystal display device surface after the liquid crystal display device is manufactured, the space between the substrates are kept constant. The liquid crystal display device with high display quality is obtained for these reasons.

While the interlayer insulating film is formed to have a predetermined hardness in the first embodiment, the interlayer insulating film of the second embodiment is made of elastic body. The second embodiment is configured in the same manner as the first embodiment, except that a different material is used for the interlayer insulating film. With this configuration, if pressure is applied to the display surface of the liquid crystal display device, the first spacer sinks in the interlayer insulating film surface and the space between the substrates changes temporarily. Nevertheless, as the pressure is removed, resilient power occurs and the space recovers to the predetermined space. Therefore, the space between the substrates of the liquid crystal display device are kept constant. The liquid crystal display device with good reliability, a low defective ratio and high display quality can be provided for these reasons in the same manner as in the first embodiment.

In either of the liquid crystal display devices of the first and second embodiments, the interlayer insulating film is preferably made of resin having a transmittance of the visible ray area of not less than 90%. With this configuration, especially if the interlayer insulating film is incorporated in a transparent type liquid crystal display device, it is possible to obtain beautiful image display with no coloring. Moreover, since transmittance can be prevented from deteriorating, it is possible to restrain increase of power consumption of the backlight.

Preferred materials with high transmittance for the liquid crystal display device of the first embodiment include polyamide imide, polyalylate, polyetherimide, epoxy and polyimide. Any of these materials can be used not only for the interlayer insulating film, but also for the first spacer which requires to be at least as hard as the interlayer insulating film. Preferred materials for the liquid crystal display device of the second embodiment include butadienestyrene copolymer, butyl rubber and fluororubber.

Meanwhile, if the interlayer insulating film is incorporated in a reflection type liquid crystal display device, the transmittance of the interlayer insulating film is not restricted. Preferred materials for the first embodiment include a coloring agent, such as Kapton (trademark of E. I. du Pont de Nemours and Co.). Preferred materials for the second embodiment include rubber-like elastic macromolecule, such as polyolefin elastomer and polyurethane rubber.

Moreover, in the two embodiments mentioned above, the interlayer insulating film is preferably made of a photosensitive material. In this case, it is possible to perform patterning with photo processing alone, and therefore it is also possible to reduce the number of manufacturing processes.

Incidentally, in the two embodiments above, the material for the interlayer insulating film is restricted in terms of hardness or elasticity, compared with prior art. As a result, there occurs a case where only an inferior material to conventional materials in terms of adherence and the like can be selected to satisfy this point. If a material of poor surface adherence is used, and the interlayer insulating film and the pixel electrode do not adhere to each other, the distance between the base substrate and the pixel electrode varies undesirably. Therefore, if the liquid crystal is injected and sealed between the first substrate (the opposite substrate 20) and the second substrate (the TFT substrate 10) including the base substrate and the pixel electrode, the layer thickness of the liquid crystal layer varies, thereby damaging the display quality. Consequently, if a conventional manufacturing method is employed for the liquid crystal display device, such a material of poor surface adherence may not be used as resin forming the interlayer insulating film .

The following description discusses a preferred method of manufacturing a liquid crystal display device when, for example, the material for the interlayer insulating film does not have desirable adherence as mentioned above. A method of manufacturing a liquid crystal display device including: a pixel electrode and a switching element (the TFT 3) for determining a display state of a pixel; an interlayer insulating film disposed between the switching element and the pixel electrode; and a base substrate (the transparent insulating substrate 11) provided with the interlayer insulating film, the switching element and the pixel electrode preferably includes steps of: (1) providing the switching element on the base substrate; (2) providing the interlayer insulating film on the switching element; (3) improving film property by making an interlayer insulating film surface rough; and (4) providing the pixel electrode on the interlayer insulating film.

The third step includes, for example, a step of ashing treatment or light radiation in which the interlayer insulating film surface is made rough prior to the fourth step of providing the pixel electrode. As a result, even if a material of poor surface adherence is used as the resin forming the interlayer insulating film, the interlayer insulating film and the pixel electrode can adhere to each other with no trouble. Note that if the film property improving treatment is ashing treatment or light radiation treatment, the treatment can be carried out as follows. If the interlayer insulating film is photosensitive, the treatment can be carried out at the same time with a process of removing residue of the photosensitive resin, whereas if the interlayer insulating film is not photosensitive, the treatment can be carried out at the same time with a process of removing photoresist during patterning of the interlayer insulating film. This can avoid an increase of the number of manufacturing processes, compared with prior art.

Moreover, a method of manufacturing a liquid crystal display device including: a pixel electrode and a switching element (the TFT 3) for determining a display state of a pixel; an interlayer insulating film disposed between the switching element and the pixel electrode; and a base substrate (the transparent insulating substrate 11) provided with the interlayer insulating film, the switching element and the pixel electrode preferably includes steps of: providing the switching element on the base substrate; providing the interlayer insulating film on the switching element; drying the interlayer insulating film with prebaking treatment before patterning the interlayer insulating film; patterning the interlayer insulating film; and providing the pixel electrode on the interlayer insulating film.

With the configuration, the interlayer insulating film is dried with prebaking treatment before pattering of the interlayer insulating film. Therefore, it is possible to prevent bad affection, such as dimensional distortion when the resin really cures, and to reduce viscosity of the resin forming the interlayer insulating film. Consequently, it is possible to improve productivity and dimensional accuracy in manufacture of the liquid crystal display device.

Moreover, the inventors of the present invention studied occurrence frequency of Newton rings, and confirmed among other things that Newton rings frequently occur in the sealing portion and that the rings were more clearly observed with a liquid crystal display device incorporating an interlayer insulating film in an underlayer of the sealing portion.

In order to prevent occurrence of Newton rings in a neighborhood of the sealing portion, the liquid crystal display device of the third embodiment includes: a liquid crystal layer; a first substrate (the opposite substrate 20) provided on one side of the liquid crystal layer; and a second substrate (the TFT substrate 10) having a base substrate facing the first substrate through the liquid crystal layer. On the base substrate of the second substrate, a sealing area is provided outside the display area, such as in the periphery of the base substrate. Moreover, an interlayer insulating film is provided between the base substrate and the liquid crystal layer, except in the sealing area. At least one switching element (the TFT 3) for controlling a display state of a pixel is provided on one side of the interlayer insulating film, whereas the pixel electrode is provided on the other side of the interlayer insulating film. In addition, the liquid crystal display device includes a sealing member, disposed to be in contact with the second substrate in the sealing area, for sealing the liquid crystal layer between the first and second substrates.

If the areas to which the interlayer insulating film is provided include an area where the sealing member and the second substrate are in contact with each other (such as the portion below the sealing member) as in prior art, there may occur curing shrinkage or thermal expansion with the resin forming the interlayer insulating film when the resin cures. This causes the space between the first and second substrate to vary and Newton rings to occur, thereby resulting in degradation of the display quality.

On the contrary, in the above configuration, the interlayer insulating film is not provided in the area where the sealing member and the second substrate are in contact with each other. Therefore, the space between the substrates can be prevented from varying when the sealing member cures. As a result, it is possible to prevent Newton rings to occur in a neighborhood of the sealing member. Besides, the defective ratio and reliability can be improved in manufacture of the liquid crystal display device.

Moreover, the sealing member preferably includes a second spacer, larger than the first spacer, for maintaining a thickness of the sealing member. The second spacer can maintain the space between the substrates with certainty even when the space between the first and second substrates in the sealing area is wider than the other areas by a value equivalent to the thickness of the interlayer insulating film. Therefore, the varying of the space between the substrates can be prevented, which otherwise would occur with the sealing member, and the occurrence of Newton rings can be restrained in a neighborhood of the sealing member. Consequently, the liquid crystal display device of high display quality can be realized.

In addition, more preferably, the sealing member includes a second spacer, having a greater hardness than the first spacer, for maintaining a thickness of the sealing member. With this configuration, the space between the substrates can be maintained with certainty. Consequently, the liquid crystal display device of high display quality can be realized.

In the above-mentioned cases where the sealing member includes the second spacer which is at least either larger than the first spacer or has a greater hardness than the first spacer, it is hoped that the following manufacturing method is adopted. A method of manufacturing a liquid crystal display device including: a liquid crystal layer having therein at least one first spacer for maintaining a thickness of the liquid crystal layer; and a sealing member, having a different second spacer from the first spacer, for sealing the liquid crystal layer with a first substrate and a second substrate disposed on respective sides of the liquid crystal layer preferably includes the steps of: (1) including the second spacer in the sealing member in advance; and (2) sealing the first spacer and a material composing the liquid crystal layer between the first and second substrates with the sealing member including the second spacer.

With this configuration, the second spacer disposed in the sealing member can be prevented from being mixed with the liquid crystal. layer. As a result, the productivity can be improved when the first spacer and a material composing the liquid crystal layer are sealed between the first and second substrates with the sealing member. Note that since the first spacer is smaller in size or has a smaller hardness than the second spacer, even if the first spacer flows into the sealing member, the first spacer does not create a bad affection to the space between the first and second substrates.

In addition, in order to keep the space between the substrates constant, the liquid crystal display device preferably includes a middle film, provided on the sealing area of the base substrate, having better adherence than the base substrate. With this configuration, the adherence of the sealing member portion is improved, and the highly reliable liquid crystal display device can be obtained. Moreover, the middle film is preferably at least one film selected from the group consisting of a metallic film, a nitride film and an oxide film. In this case, the material for the middle film becomes the same with the material for the source wiring of the switching element and the like. Therefore, one process can be shared for forming the switching element and for forming the middle film, which is especially preferable.

Moreover, the interlayer insulating film in the neighborhood of the sealing area is preferably provided to form a slope so that the sealing area is thinner than the other area. With this configuration, foam and the like can be prevented in advance from occurring during injection of the liquid crystal, and the liquid crystal can be thus smoothly injected.

The invention being thus described, it will be obvious that the same may be varied in many ways. Such variations are not to be regarded as a departure from the spirit and scope of the invention, and all such modifications as would be obvious to one skilled in the art intended to be include within the scope of the following claims.

What is claimed is:

1. A liquid crystal display device comprising:
   a liquid crystal layer;
   a first substrate provided on one side of the liquid crystal layer;
   at least one spacer between the first substrate and a second substrate for maintaining a thickness of the liquid crystal layer;
     said second substrate including at least one switching element for controlling a display state of a pixel, a pixel electrode connected to one of two ends of the switching element, an interlayer insulating film having a greater hardness than the spacer, the interlayer insulating film being provided between the switching element and the pixel electrode so as to insulate the other end of the switching element from the pixel electrode, the interlayer insulating film is a resin and has a thickness of 1.5 $\mu$m or greater, and a base substrate facing the first substrate through the liquid crystal layer and the interlayer insulating film; and
   a sealing member for sealing the liquid crystal layer between the first and second substrates.

2. The liquid crystal display device as defined in claim 1, wherein the interlayer insulating film is specified to have a flat surface.

3. The liquid crystal display device as in claim 1, wherein the interlayer insulating film is made of a resin having a transmittance of a visible ray area of more than 90%.

4. The liquid crystal display device as defined in claim 3, wherein the resin is at least one resin selected from the group consisting of polyamide imide, polyalylate, polyetherimide, epoxy and polyimide.

5. The liquid crystal display device as defined in claim 1, wherein the interlayer insulating film and the spacer each have such a hardness that no Newton rings are produced.

6. The liquid crystal display device as defined in claim 1, wherein the interlayer insulating film is made of a photosensitive material.

7. A liquid crystal display device as in claim 2 wherein said interlayer insulating film has a spectral transmittance for blue less than for green and red.

8. A liquid crystal display device, comprising:
   a liquid crystal layer including therein at least one spacer for maintaining a thickness of the liquid crystal layer;
   a first substrate provided on one side of the liquid crystal layer;
   a second substrate including at least one switching element for controlling a display state of a pixel, a pixel electrode connected to one of two ends of the switching element, an interlayer insulating film having a Rockwell hardness of E45 or greater, the hardness of said interlayer insulating film being greater than a hardness of the spacer, the interlayer insulating film being provided between the switching element and the pixel electrode so as to insulate the other end of the switching element from the pixel electrode, the interlayer insulating film is a resin and has a thickness of at least 1.5 $\mu$m, and a base substrate facing the first substrate through the liquid crystal layer and the interlayer insulating film; and
   a sealing member for sealing the liquid crystal layer between the first and second substrates.

9. The liquid crystal display device as defined in claim 8, wherein the interlayer insulating film is specified to have a flat surface.

10. The liquid crystal display device as defined in claim 8, wherein the interlayer insulating film is made of a resin having a transmittance of a visible ray area of more than 90%.

11. The liquid crystal display device as defined in claim 10, wherein the resin is at least one resin selected from the group consisting of polyamide imide, polyalylate, polyetherimide, epoxy, and polyimide.

12. The liquid crystal display device as defined in claim 8, wherein the interlayer insulating film and the spacer each have such a hardness that no Newton rings are produced.

13. The liquid crystal display device as defined in claim 8, wherein the interlayer insulating film is made of a photosensitive material.

14. A liquid crystal display device as in claim 8 wherein said interlayer insulating film has a spectral transmittance for blue less than for green or red.

15. A liquid crystal display device comprising:
   a liquid crystal layer;
   a first substrate provided on one side of the liquid crystal layer;
   at least one spacer between the first substrate and a second substrate for maintaining a thickness of the liquid crystal layer between the first substrate and the second substrate;
     said second substrate including at least one switching element for controlling a display state of a pixel, a pixel electrode connected to one of two ends of the switching element, an interlayer insulating film having the same or greater hardness than the spacer, the interlayer insulating film being provided between the switching element and the pixel electrode so as to insulate the other end of the switching element from the pixel electrode, the interlayer insulating film is a resin and has a thickness of 1.5 µm or greater, and a base substrate facing the first substrate through the liquid crystal layer and the interlayer insulating film; and a sealing member for sealing the liquid crystal layer between the first and second substrates.

16. A liquid crystal display device comprising:

a liquid crystal layer;

a first substrate provided on one side of the liquid crystal layer;

at least one spacer between the first substrate and a second substrate for maintaining a thickness of the liquid crystal layer between the first substrate and the second substrate;

said second substrate including at least one switching element for controlling a display state of a pixel, a pixel electrode connected to one of two ends of the switching element, an acrylic resin interlayer insulating film having the same or greater hardness than the spacer, the interlayer insulating film being provided between the switching element and the pixel electrode so as to insulate the other end of the switching element from the pixel electrode, the interlayer insulating film has a thickness of 1.5 µm or greater, and a base substrate facing the first substrate through the liquid crystal layer and the interlayer insulating film; and a sealing member for sealing the liquid crystal layer between the first and second substrates.

17. A liquid crystal display device, comprising:

a liquid crystal layer including therein at least one spacer for maintaining a thickness of the liquid crystal layer;

a first substrate provided on one side of the liquid crystal layer;

a second substrate including at least one switching element for controlling a display state of a pixel, a pixel electrode connected to one of two ends of the switching element, an acrylic resin interlayer insulating film having a Rockwell hardness of E45 or greater, the hardness of said interlayer insulating film being the same as or greater than a hardness of the spacer, the interlayer insulating film being provided between the switching element and the pixel electrode so as to insulate the other end of the switching element from the pixel electrode, the interlayer insulating film is a resin and has a thickness of at least 1.5 µm, and a base substrate facing the first substrate through the liquid crystal layer and the interlayer insulating film; and a sealing member for sealing the liquid crystal layer between the first and second substrates.

* * * * *